(12) United States Patent
Pocholle et al.

(10) Patent No.: US 10,014,647 B2
(45) Date of Patent: Jul. 3, 2018

(54) HIGH-POWER LASER FIBER SYSTEM

(75) Inventors: Jean-Paul Pocholle, La Norville (FR);
François-Xavier Doittau,
Behoust/Orgerus (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 12/935,084

(22) PCT Filed: Mar. 27, 2009

(86) PCT No.: PCT/EP2009/053648
§ 371 (c)(1),
(2), (4) Date: Oct. 25, 2010

(87) PCT Pub. No.: WO2009/118404
PCT Pub. Date: Oct. 1, 2009

(65) Prior Publication Data
US 2011/0235658 A1    Sep. 29, 2011

(30) Foreign Application Priority Data

Mar. 28, 2008   (FR) ..................... 08 01714

(51) Int. Cl.
*H01S 3/067* (2006.01)
(52) U.S. Cl.
CPC ...... *H01S 3/06745* (2013.01); *H01S 3/06737* (2013.01)
(58) Field of Classification Search
CPC ............. H01S 3/06708; H01S 3/06745; H01S 3/06729
USPC ........................... 372/6; 385/124, 43
See application file for complete search history.

(56) References Cited

U.S. PATENT DOCUMENTS

| | | | | |
|---|---|---|---|---|
| 4,163,654 A | * | 8/1979 | Krohn et al. | 65/404 |
| 5,333,218 A | * | 7/1994 | Ortiz, Jr. | 385/43 |
| 5,379,149 A | * | 1/1995 | Snitzer et al. | 359/341.5 |
| 5,940,567 A | * | 8/1999 | Garito | 385/127 |

(Continued)

FOREIGN PATENT DOCUMENTS

| | | |
|---|---|---|
| EP | 1 764 350 | 3/2007 |
| EP | 1 764 350 A1 | 3/2007 |

(Continued)

OTHER PUBLICATIONS

Xie Wen, et al., "Single-Mode Parabolic Gain-Guiding Optical Fiber with Core Diameter up to 200 um", International Journal of Infrared and Millimeter Waves, Feb. 28, 2008, vo. 29, XP002513190, p. 406-415.*
Xie Wen, et al., "Single-Mode Parabolic Gain-Guiding Optical Fiber with Core Diameter up to 200μm", International Journal of Infrared and Millimeter Waves, Feb. 28, 2008, pp. 406-415, vol. 29, XP002513190.

(Continued)

*Primary Examiner* — Joshua King
(74) *Attorney, Agent, or Firm* — Baker & Hostetler LLP

(57) ABSTRACT

The invention relates a power fiber laser system including at least one single-mode fiber laser, emitting at a signal wavelength, the fiber including at least one outer cladding and a core, in which the core of the fiber has a radially graded index. The fiber includes, at least over a part of its length, a geometrical section having a graded fiber-core radius that decreases between an input end of the section and an output end of the section, the core radius and the index variation between the cladding and the fiber at the input end being such that the normalized frequency at the signal wavelength is less than the normalized cutoff frequency at which the fiber becomes unimodal.

20 Claims, 13 Drawing Sheets

(56) References Cited

U.S. PATENT DOCUMENTS

| | | | |
|---|---|---|---|
| 6,031,850 A * | 2/2000 | Cheo | 372/6 |
| 6,882,664 B2 * | 4/2005 | Bolshtyansky ... | H01S 3/094003 372/6 |
| 7,657,142 B2 | 2/2010 | Gasca et al. | |
| 7,764,854 B2 | 7/2010 | Fini | |
| 2006/0127001 A1 * | 6/2006 | Oikawa | 385/28 |
| 2007/0041083 A1 | 2/2007 | Di Teodoro et al. | |
| 2007/0147751 A1 * | 6/2007 | Fini | 385/123 |
| 2008/0050069 A1 * | 2/2008 | Skovgaard et al. | 385/39 |

FOREIGN PATENT DOCUMENTS

| | | |
|---|---|---|
| JP | 10-125988 | 5/1998 |
| JP | 10-125988 A | 5/1998 |
| JP | 2007-179058 | 7/2007 |
| JP | 2007-179058 A | 7/2007 |
| WO | 2006/090002 | 8/2006 |
| WO | 2006/090002 A1 | 8/2006 |

OTHER PUBLICATIONS

Libo Li, et al., "High Power Single Transverse Mode Operation of a Tapered Large-Mode-Area Fiber Laser", Optics Communications, , Oct. 29, 2007, pp. 655-657, vol. 281, No. 4, Amsterdam, NL, XP022409140.

A.S. Kurkov, et al., "Ytterbium-doped Fibre Laser with a Bragg Grating Reflector Written in a Multimode Fibre", Quantum Electronics, Apr. 2005, pp. 339-340, vol. 35, No. 4, XP002513191.

W.A.Gambling, et al., "Cut-Off Frquency in Radially Inhomogeneous Singel-Mode Fibre", Electronics Letters UK, Mar. 3, 1977, pp. 139-140, vol. 13, No. 5, XP002513192, XP002513192.

D. Marcuse: "Gaussian approximation of the fundamental modes of graded-index fibers", JOSA 68 (1) Jan. 1978, pp. 103-109.

D. Gloge: "Weakly guiding fibers" Appl. Opt. 10 (10), Oct. 1973, pp. 2252-2258.

D. Marcuse: "Loss analysis of single-mode fiber splices", Bell Syst.Tech . J., vol. 56, No. 5, 1977, p. 703-719.

* cited by examiner

HIGH-POWER LASER FIBER SYSTEM

CROSS-REFERENCE TO RELATED APPLICATIONS

This application is a National Stage of International patent application PCT/EP09/053648, filed on Mar. 27, 2009, which claims priority to foreign French patent application No. FR 08 01714, filed on Mar. 28, 2008, the disclosures of which are incorporated by reference in their entirety.

FIELD OF THE INVENTION

The field of the invention is that of high-power laser sources of the class emitting from 100 W to a few kW or even to around 10 kW and more precisely the field of fiber laser sources operating in continuous wave or virtually continuous wave mode, notably intended to irradiate a target.

BACKGROUND OF THE INVENTION

To produce such systems, weakly guiding single-mode fibers are generally used, to obtain a unimodal propagation and a large core radius.

Any optical source required to deliver power (or energy) over a distance must have the highest radiance possible so as to provide the strongest irradiance (or fluence) on a target.

Fiber lasers are, at the present time, the sources that enable the highest radiances to be obtained. The radiance of a source is given by the formula:

$$Rad(W/m^2 \cdot sr) = \frac{P_L(W)}{S(m^2)\Omega(sr)}$$

$P_L$ being the radiant flux delivered by the source, S is the emissive area of the source, and $\Omega$ represents the solid angle of the beam. The product $$S \times \Omega$$

is called the throughput, which is an optical invariant.

For an optical fiber in a single-mode (or unimodal) operating regime the relationship between the core radius a and the relative index difference $$\Delta \approx \frac{n_1 - n_2}{n_1}$$

($n_1$ corresponding to the refractive index of the core material and $n_2$ to the refractive index of the optical cladding) is given by the following equation, published in the article "Weakly guiding fibers" by D. Gloge, Appl. Opt. 10 (10), October 1973, p. 2252:

$$V = ka\sqrt{n_1^2 - n_2^2} \approx kan_1\sqrt{2\Delta} \leq 2.4048$$

where V is a parameter called the normalized frequency and $$k = 2\pi/\lambda,$$

with $\lambda$ the wavelength. This relationship is applicable to step-index fibers. FIG. 1 shows the various optical and geometrical parameters that characterize a standard optical fiber.

So as to reduce the appearance of nonlinearity effects, waveguiding structures having the largest mode area possible are preferably used.

To this end, the following problem should be solved: a large mode-dimension requires a very weakly-guiding fiber. A very weakly-waveguided propagation makes the handling of the fiber very critical because the fiber is very sensitive to any bending or microbending. However, a strongly-guiding fiber implies a small core radius, which is unsatisfactory due to the associated nonlinearity effects.

SUMMARY OF THE INVENTION

In this context, the present invention provides a high-power fiber laser system comprising at least one fiber the optical properties of which are optimized by virtue of particular optical and geometrical properties.

More precisely, the subject of the invention is a power fiber laser system comprising at least one single-mode fiber laser, emitting at a signal wavelength ($\lambda$), said fiber comprising at least one outer cladding and a core characterized in that the core of said fiber has a radially graded index and comprises, at least over a part of its length, a geometrical section having a graded fiber-core radius that decreases between an input end of the section and an output end of the section, the core radius and the index variation between the cladding and the fiber at the input end being such that the normalized frequency V at the signal wavelength is less than the normalized cutoff frequency Vc at which the fiber becomes unimodal.

According to one embodiment of the invention, the graded index has a parabolic profile.

According to one embodiment of the invention, the graded index has a triangular profile.

According to one embodiment of the invention, the fiber comprises a section of conic geometry, a first, cladding radius ($r_1$) and a second, core radius ($r_2$), the first and second radii being defined, respectively, by the following equations:

$$r_1(z) = r_1c(1 - m_1z)$$

$$r_2(z) = r_2c(1 - m_2z).$$

According to one embodiment of the invention, the system comprises several single-mode fibers distributed so as to couple the modes of said fibers, one of the fibers being an emergent fiber at the signal wavelength of the laser emission beam.

According to one embodiment of the invention, the fibers are distributed in a geometrical array in a plane perpendicular to the length of said fibers.

According to one embodiment of the invention, the fibers are distributed in a circle around a central fiber.

According to one embodiment of the invention, the system comprises a preform comprising a bundle of rods which, after they have been drawn, form the claddings and cores of individual fibers.

According to one embodiment of the invention, the laser system comprises:
- a fiber pigtail intended to receive pump power from a laser diode;
- a bundle of radially coupled fibers stretched so as to optimize the coupling; and
- a central fiber from which the signal wavelength of the laser beam emerges.

According to one embodiment of the invention, the emergent fiber comprises a mirror function—this mirror may advantageously be a (photowritten) Bragg reflector.

According to one embodiment of the invention, the system comprises axicons coupled to the opposite ends of the fibers to those comprising the conical sections so as to multiplex different polarization states of a signal wave.

According to one embodiment of the invention, the system comprises at least one fiber having a silica cladding.

According to one embodiment of the invention, the system comprises at least one fiber comprising a silica core doped with an oxide such as GeO2.

According to one embodiment of the invention, the fiber core comprises peripheral layers containing varying amounts of GeO2 so as to ensure a radially graded index within the core.

According to one embodiment of the invention, the system comprises at least one fiber having a core made of silica doped with rare-earth ions, so as to ensure lasing.

BRIEF DESCRIPTION OF THE DRAWINGS

The invention will be better understood and other advantages will become clear on reading the following nonlimiting description and by virtue of the appended figures in which.

DETAILED DESCRIPTION

The essence of the invention lies in the use of fiber, the core of which has a radial index profile, to produce a power fiber laser system. This profile may notably be parabolic or triangular—details of the behavior obtained with these configurations will be given in the description below.

Moreover, it may be of particular benefit to combine such a radial index profile with a longitudinal fiber-core gradient.

Figure 1:
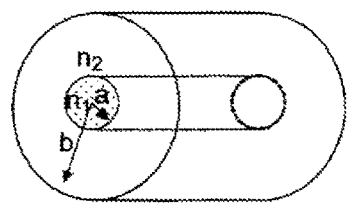
FIG. 1 shows the various optical and geometrical parameters that characterize an optical fiber.
Figure 2:
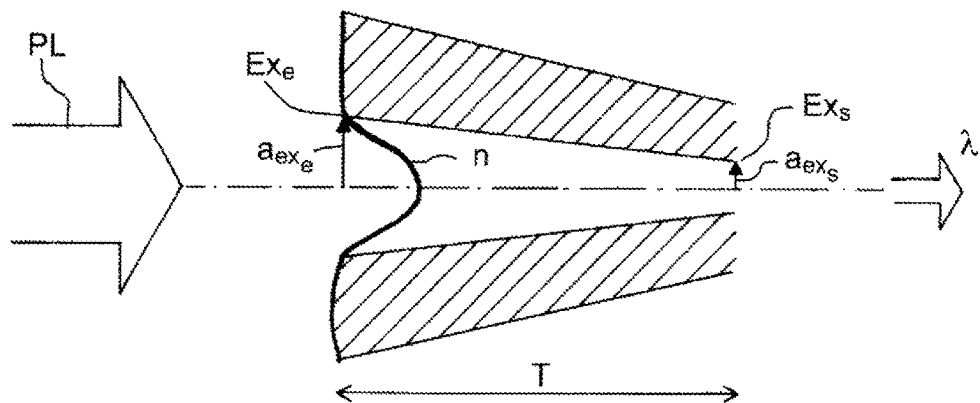
FIG. 2 shows schematically a power fiber laser, used in a laser system according to the invention.

FIG. 2 thus shows a schematic of a power fiber laser used in a laser system according to the invention. This fiber is intended to be supplied with laser power PL so as, at the out of the fiber, to generate a laser beam emitting at a signal wavelength λ.

This fiber comprises a section T having an input end Exe and an output end Exs, a longitudinal core-radius gradient and a radial index profile The analysis below pertains to the properties obtained with such a decreasing fiber core radius gradient:

As is known, although the solution of Maxwell's equations applied to a cylindrically-symmetric two-dielectric structure leads to an expression for the radial field distribution in the form of Bessel functions and modified Bessel functions of the first kind, this field distribution may be approximated by a Gaussian function with a 1/e mode radius (for the field but $1/e^2$ for the irradiance) having the form:

$$w_0(\lambda) = a\left(0.65 + \frac{1.619}{V^{3/2}(\lambda)} + \frac{2.879}{V^6(\lambda)}\right).$$

This function, formulated by D. Marcuse and notably described in the article "Loss analysis of single-mode fiber splices", Bell Syst. Tech. J., Vol. 56, No. 5, 1977, p. 703-719, is applicable in the range $$0.8 < V < 2.8.$$

A variant allows the propagation of the mode to be directly connected to the signal wavelength (the laser in the case considered) for a given cutoff wavelength $\lambda_c$.

This wavelength $\lambda_c$ defines the spectral range in which only the groups of HE11 modes with their two polarization eigenstates (LP01) can propagate without loss (in the electromagnetical sense). For smaller wavelengths, the groups of $LP_{11}$ modes may exist and propagate with the group of $LP_{01}$ modes (multimodal regime). This relationship is the following:

$$w_0(\lambda) \approx a\left(0.65 + 0.434\left(\frac{\lambda}{\lambda_c}\right)^{3/2} + 0.0149\left(\frac{\lambda}{\lambda_c}\right)^6\right).$$

By way of example, it is possible to calculate the variation in the mode radius from the optical and geometrical parameters that characterize an optical fiber.

In the presence of a linear taper, the size of the mode increases as a function of the ratio $\lambda/\lambda c$ whereas the core radius decreases.

Thus, by way of example, it is possible to consider a fiber laser emitting a signal wave at $\lambda=1.07$ µm and having a core radius and index variation $\Delta=10-3$ such that the initial cutoff wavelength is equal to $\lambda C=0.75$ µm. This cutoff wavelength $\lambda C=0.75$ µm corresponds to a normalized frequency parameter $V=2.4048$ and to a mode radius w0(0.75 µm)=4.85 µm.

At the signal wavelength, a parameter V equal to $V=1.68$ and a mode size (radius) w0(1.07 µm)=6.715 µm are obtained.

These parameters lead to an HE11 mode weakly confined to the region covered by the core radius of the fiber.

Typically, the fiber has a cladding diameter of 100 µm. It should be noted that, generally, fiber lasers called double-cladding fiber lasers are characterized by a cladding diameter of about 400 µm, so as to couple pump diodes via an assembly of multimode couplers.

According to a first embodiment proposed by the invention, the fiber-core radius gradient may be a conical profile, that is to say that, typically, when tapered over an arbitrary distance of 1 m, so as to obtain adiabatic coupling with a conicity of 50%, corresponding to variation from an initial cladding diameter of 100 µm to 50 µm, it is possible to calculate the variation in the various radii (of the core and cladding) homothetically:

$$\left.\begin{array}{c}b(z)\\z(z)\end{array}\right\} = \left\{\begin{array}{c}b_C(1-0.5z)\\a_C(1-0.5z)\end{array}\right.$$

Figure 3A:
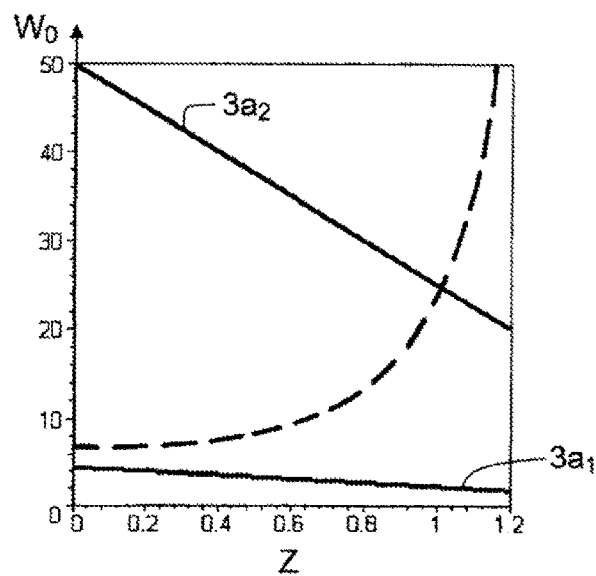
FIG. 3a shows the variation in the radius of the $HE_{11}$ mode as a function of the distance in a tapered fiber structure.

The variation in the mode radius as a function of distance is then shown in FIG. 3a, the lines $3a_1$ and $3a_2$ showing, respectively, the variation in the core radius and the cladding radius as a function of the distance z.

At one end of the tapered part, the normalized frequency parameter is equal to $V=0.84$, a value close to the limit of validity of the formula defining the Gaussian model of the modal distribution of the $HE_{11}$ mode or group of $LP_{01}$ modes. The curves of FIG. 3a clearly show that over a $z \approx 1$ m length of section of conical profile, the 1/e field radius of the mode is approximately equal to the radius of the cladding. Beyond this, the mode is subjected to diffraction and refraction effects leading to beam losses.

It is known that the optical damage threshold of a dielectric medium (in terms of fluence (J/m2) or in terms of irradiance (W/m2)) is always less at the interface compared to that characterizing the bulk behavior. The conical geometry thus allows this limitation to be partly overcome, in particular, if it desired to maximize the optical power that a laser or an optical-fiber amplifier system can deliver.

Thus, two criteria need to be fulfilled: single-mode optical fibers having a low cutoff wavelength for the group of LP11 modes compared to the signal wavelength must be developed that also have a conicity at the end of each fiber laser.

It is then possible to evaluate the effects of a taper on the field, assuming an irradiance proportional to the field modulus squared:

$$I(r,z) \propto |E|^2.$$

To calculate the radial extension of the mode, the irradiance distribution is calculated. To do this, the power transmitted by the mode is defined by the formula:

$$P_T = I_0(z) \int_0^{2\pi} \int_0^\infty e^{-2\left(\frac{r}{w_0(z)}\right)^2} r \, dr \, d\phi = I_0 \frac{\pi w_0^2(z)}{2}$$

and the distribution of the irradiance (W/m²) is thus:

$$I(r,z) = \frac{2P_T}{\pi w_0^2(z)} e^{-2\left(\frac{r}{w_0(z)}\right)^2}.$$

Figure 3B:
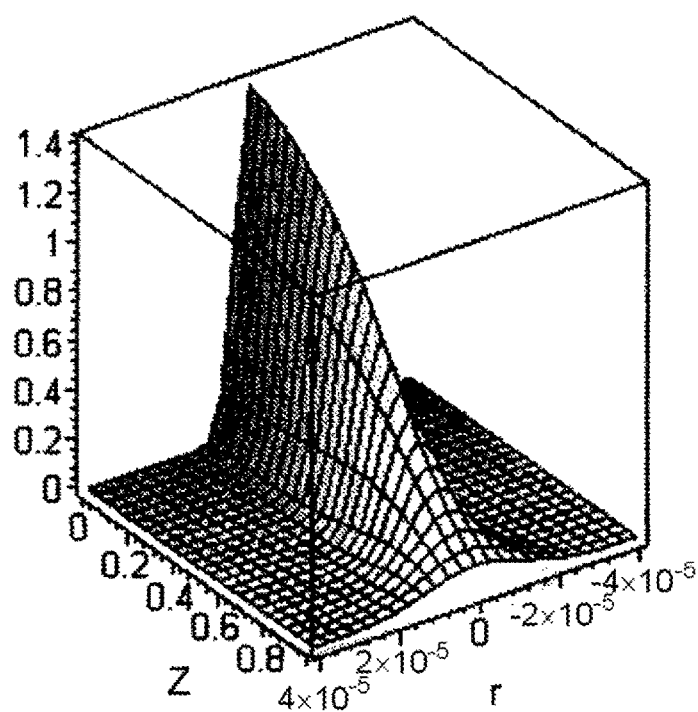
FIG. 3b shows the irradiance distribution as a function of the radial distance and of the propagation distance through the tapered fiber.

The irradiance distribution as a function of the radial distance and the propagation distance through the tapered fiber is shown in FIG. 3b, taking the transmitted optical power to be 1 W.

At the distance z=1 m it is observed that the power distribution is not contained within the cladding diameter (50 µm in the case shown).

Figure 3C:
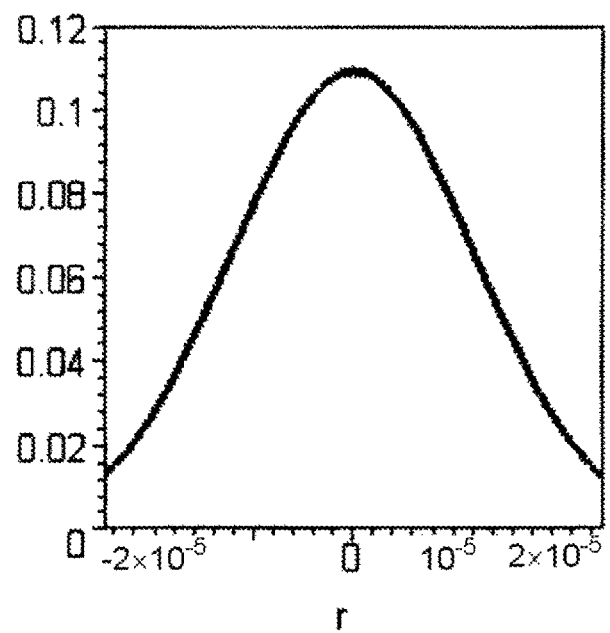
FIG. 3c shows the irradiance at z=1 m for a fiber having a 50% conicity from a 100 μm initial diameter.

FIG. 3c shows the irradiance distribution at this point and for the proposed conicity.

A straight-forward calculation gives the percentage of the power contained in a centered circular opening of radius b:

$$\eta_g = \frac{\int_0^b e^{-2\left(\frac{r}{w_0}\right)^2} r\,dr}{\int_0^\infty e^{-2\left(\frac{r}{w_0}\right)^2} r\,dr} = 1 - e^{-2\left(\frac{b}{w_0}\right)^2}.$$

Figure 4:
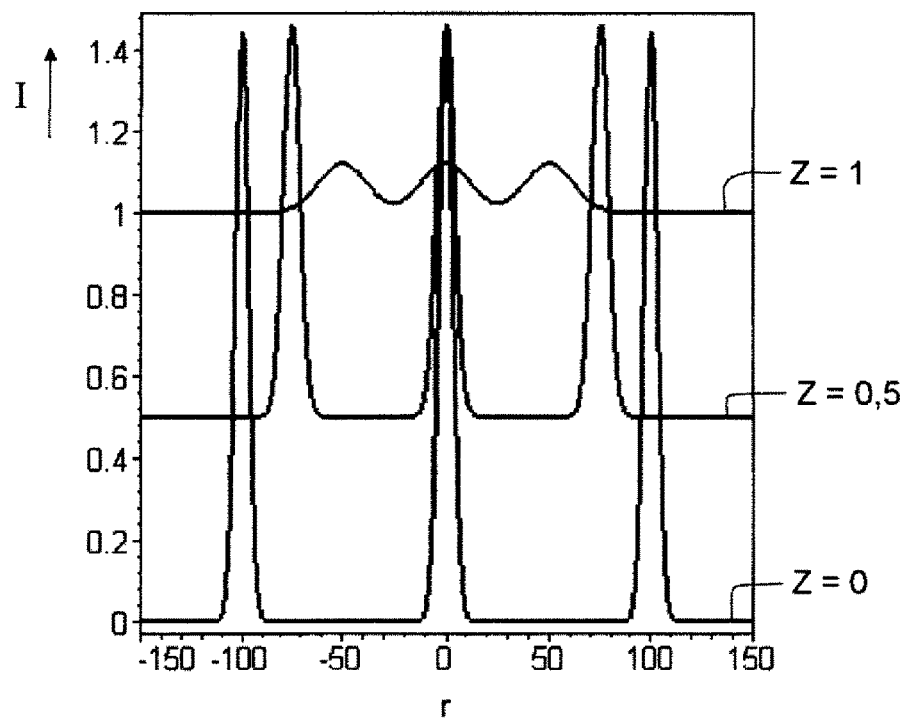
FIG. 4 shows the irradiance distribution as a function of distance in three 100 μm initial diameter fibers comprising tapered sections with a 50% conicity over 1 m.

On the basis of these preliminary data, it is possible to analyze a combination of several fibers in tape form, for example three fibers that undergo collectively a tapering of their ends. Considering the case of uncoupled fibers, i.e. there is no mode coupling, a description of the irradiance distribution can be obtained, as shown in FIG. 4.

Thus, an overall low power density and a reduced effective emission area are obtained at the fiber output. Such an architecture therefore allows the optical flux restrictions to be met whilst increasing the radiance of the emission source.

The essence of the invention lies in the use of fiber, the core of which has an index profile. This profile may notably be parabolic or triangular.

It is possible to consider a Gloge-Marcatili index gradient distribution, described notably in "Multimode theory of graded core fibers" by D. Gloge and E. A. J. Marcatili, Bell Sys. Tech. J., Vol. 52, 1973, p. 1563-1578:

$$n^2(r) = \begin{cases} n_1^2(1 - 2\Delta(r/a)^\alpha) & r \leq a \\ n_1^2(1 - 2\Delta) & |r| > a; \end{cases}$$

For α=2 (parabolic profile), the normalized cutoff frequency parameter of the mode group adjacent to the LP01 mode (unimodal) group is equal to Vc=3.518, as described in the article "Cut-off frequency in radially inhomogeneous single-mode fiber" by W. A. Gambling, D. N. Payne and H. Matsumura, Electr. Letters 13 (5) Mar. 3, 1977, p. 139, as compared to a parameter value of Vc=2.4048 for a step-index fiber (α=∞).

The core radius is thus increased by the ratio Vc(α=2)/Vc(α=∞)=1.463. This ratio is greater still if a triangular profile is considered for which Vc=4.381 and Vc (α=1)/Vc (α=∞)=1.8218.

A more general formula giving the variation in the mode radius as a function of the parameter V for a fiber with a parabolic profile is given by D. Marcuse in "Gaussian approximation of the fundamental modes of graded-index fibers", JOSA 68 (1) January 1978, p. 103.

$$\frac{w_0}{a} = \frac{A}{V^{2/\alpha+2}} + \frac{B}{V^{3/2}} + \frac{C}{V^6}$$

$$A = \left(\frac{2}{5}\left(1 + 4\left(\frac{2}{\alpha}\right)^{5/6}\right)\right)^{1/2}$$

$$B = e^{0.298/\alpha} - 1 + 1.478(1 - e^{-0.077\alpha})$$

$$C = 3.76 + e^{4.19/\alpha^{0.418}}$$

The above set of parameters and equations validates the concept of the present invention, proposing to produce laser sources with this type of index gradient.

Not only does this type of structure enable the threshold at which nonlinear effects appear and optical damage occurs to be increased, but it also enables losses related to bending or microbending to be reduced by increasing the index difference (i.e. the optical guiding), since Vc is increased.

Figure 5:
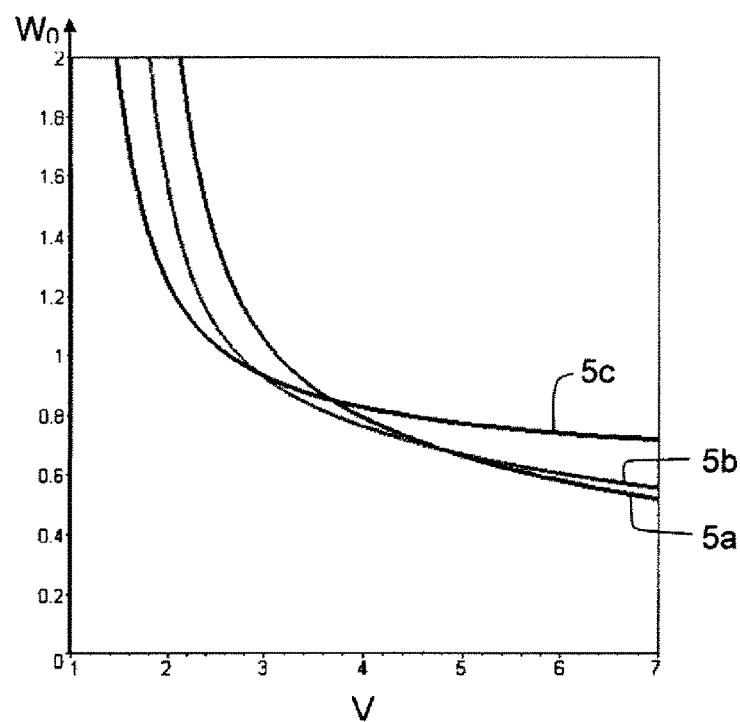
FIG. 5 shows a graph of the variation in the radius of the mode normalized to the core radius of a fiber as a function of the normalized frequency parameter and as a function of the index gradient.

FIG. 5 shows the variation in the mode radius normalized to the core radius of a fiber as a function of the normalized frequency parameter and as a function of the index gradient: curve 5a is for a coefficient α=1, the curve 5b for α=2, and curve 5c is for an infinite α coefficient.

A formula similar to that developed above for a step-index fiber but for a tapered parabolically-graded fiber gives the variation in the mode radius as a function of z.

In this case, the relative index difference is Δ=4×10−3 (four times larger than for a step-index fiber) and the cutoff wavelength is taken to be Vc=3.518 for a wavelength of 0.8 μm.

Figure 6:
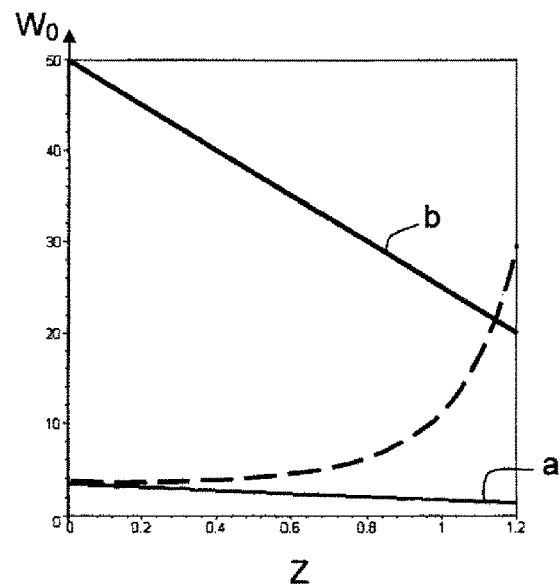
FIG. 6 shows a graph of the variation in the radius of the $HE_{11}$ as a function of the structure in a parabolic-profile tapered fiber.

FIG. 6 shows the variation in the HE11 mode radius, in microns, as a function of the distance into a tapered structure with a parabolic profile; also shown are the core radius (curve a) and the cladding radius (curve b).

Figure 7:
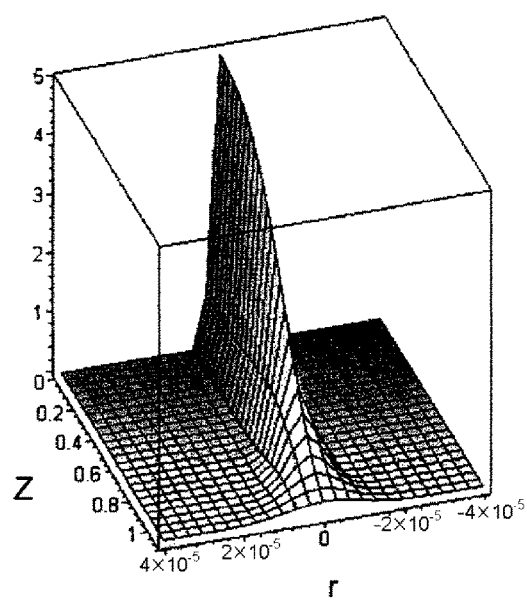
FIG. 7 shows a graph of the variation in the irradiance as a function of the distance in the conical part of a graded-index fiber.

FIG. 7 shows the variation in the irradiance as a function of the distance into the conical part of a fiber with a parabolic profile, the parameters of which are the following: a radius a=3.446 μm; a variation Δ=4×10−3; and a cutoff wavelength λ_c=0.8 μm. At the signal wavelength of the laser (λ=1.07 μm) the initial normalized frequency parameter is equal to V=2.623 for an identical conicity to that used in the analysis of a tapered step-index fiber.

Thus it may be seen that, using a fiber laser with a parabolic index-profile leads not only to strong confinement at the laser wavelength, reducing the threshold for coherent emission, but also to coupling with a conical part that enables the optical damage thresholds to be increased at the ends.

System according to the invention comprising several coupled fiber lasers

In the case of two parallel waveguides with identical optical and geometrical parameters (modes characterized by one and the same propagation constant β) spaced such that the evanescent parts are able to partially intercept the adjacent waveguide, in the absence of differential losses, the coupling equations may be written as:

$$\frac{d}{dz}\begin{vmatrix} a_1(z) \\ a_2(z) \end{vmatrix} + i \begin{vmatrix} \beta & C \\ C & \beta \end{vmatrix} \begin{vmatrix} a_1(z) \\ a_2(z) \end{vmatrix} = \begin{vmatrix} 0 \\ 0 \end{vmatrix}$$

where $a_j(z)$ corresponds to the amplitude of the complex fields transmitted by the waveguides, $j=1,2$ and C is the coupling coefficient between waveguides.

The solution of these equations for incident in-phase amplitudes $\alpha_1(0)$ and $\alpha_2(0)$ is:

$a_1(z) = a_1(0)\cos(Cz) - ia_2(0)\sin(Cz)$ $a_2(z) = a_2(0)\cos(Cz) - ia_1(0)\sin(Cz)$ giving a modulus $|a_j|^2$ corresponding to the irradiance of:

$|a_1(z)|^2 = a_1^2(0)\cos^2(Cz) + a_2^2(0)\sin^2(Cz)$ $|a_2(z)|^2 = a_1^2(0)\cos^2(Cz) + a_1^2(0)\sin 2(Cz)$ When a single field is incident, the equation for the linear coupler are:

$|a_1(z)|^2 = a_1^2(0)\cos^2(Cz)$ $|a_2(z)|^2 = a_1^2(0)\sin^2(Cz)$

Figure 8:
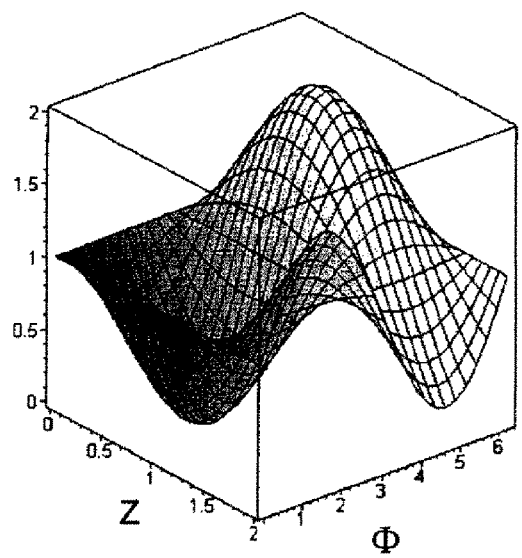
FIG. 8 shows a graph of the variation in the irradiance $|a_1(z)|^2$ at a given wavelength.

When there are two incident fields, but with a phase difference of Δϕ between them:

$a_1(0) = a_1$ $a_2(0) = a'_2 e^{i\Delta\phi}$ the following solutions are obtained:

$|a_1(z)|^2 = a_1^2(0)\cos^2(Cz) - a_1(0)a_2(0)\sin(2Cz)\sin(\Delta\phi) + a_2^2(0)\sin^2(Cz)$ $|a_2(z)|^2 = a_2^2(0)\cos^2(Cz) + a_1(0)a_2(0)\sin(2Cz)\sin(\Delta\phi) + a_1^2(0)\sin^2(Cz)$ A graph of the variation in the irradiance $|a_1(z)|^2$ at a given wavelength is plotted in FIG. 8 with the following parameter settings: $\alpha_1(0)=1$, $\alpha_2(0)=1$ and C=1.

Generally, the linear coupler makes use of the ability to address the output power as a function of the excitation of one of the two waveguides. For this application, only the phase relationships between two waves simultaneously coupled at both ends are of interest. On the other hand, if it were desired to obtain coherent transfer, the analysis of the behavior of the coupler would need to take into account the relative initial phase between the two fields, explaining the above analysis.

Still more generally, in the presence of two coupled waveguides, characterized by a difference $$\Delta\beta = \beta_1 - \beta_2$$

between the propagation constants of the structures, the following are obtained:

$$|a_1(z)|^2 = \frac{1}{\left(\frac{\Delta\beta}{2}\right)^2 + C^2} \left[ \begin{array}{c} C^2\cos^2\xi(a_1^2 - a_2^2) - a_1 a_2 \Delta\beta C\cos\phi\sin^2\xi + \left(\frac{\Delta\beta}{2}\right)^2 a_1^2 a_2^2 C^2 \\ -2a_1 a_2 C\sin\phi\sqrt{C^2 + \left(\frac{\Delta\beta}{2}\right)^2}\cos\xi\sin\xi \end{array} \right]$$

$$|a_2(z)|^2 = \frac{1}{C^2 + \left(\frac{\Delta\beta}{2}\right)^2} \left[ \begin{array}{c} -C^2\cos^2\xi(a_1^2 - a_2^2) + a_1 a_2 \Delta\beta C\cos\phi\sin^2\xi + \left(\frac{\Delta\beta}{2}\right)^2 a_2^2 + a_1^2 C^2 \\ +2a_1 a_2 C\sin\phi\sqrt{C^2 + \left(\frac{\Delta\beta}{2}\right)^2}\cos\xi\sin\xi \end{array} \right]$$

where $$\xi = z\sqrt{C^2 + \left(\frac{\Delta\beta}{2}\right)^2}.$$

For $\phi = 0$ and in the presence of a single field incident on the coupler ($a_2(0) = 0$), the conventional equation for a directional coupler with different propagation constants:

$$\frac{|a_2(z)|^2}{|a_1(0)|^2} = \frac{C^2}{C^2 + \left(\frac{\Delta\beta}{2}\right)^2} \sin^2\left(\sqrt{C^2\left(\frac{\Delta\beta}{2}\right)^2} \, z\right).$$

Figure 9:
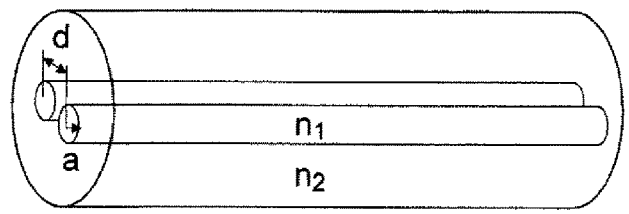
FIG. 9 shows a two-fiber linear coupler.

For two identical cylindrical axisymmetric dielectric waveguides, shown in FIG. 9, the coupling coefficient C is given by:

$$C = \frac{\sqrt{2\Delta}}{a} \frac{U^2}{V^3} \frac{K_0(Wd/a)}{K_1^2(W)}$$

where d is the distance between the two cores of radius a and U and W are the transverse propagation constants in the core and in the cladding respectively of the optical fiber.

$$K_0(x)$$

and $$K_1(x)$$

are 0-order and $1^{st}$-order modified Bessel functions of the second kind that have x as their argument.

The parameters U and W result from the solution of Maxwell's equations applied to a cylindrical waveguide structure with two dielectrics.

$$\frac{U^2}{a^2} = k^2 n_1^2 - \beta^2$$

$$\frac{W^2}{a^2} = \beta^2 - k^2 n_2^2$$

where β is the propagation constant associated with the electromagnetic mode able to propagate in the waveguided regime. It is from these equations that the normalized frequency parameter is defined:

$$V^2 = U^2 + W^2 = k^2 a^2 n_1^2 2\Delta.$$

Figure 10:
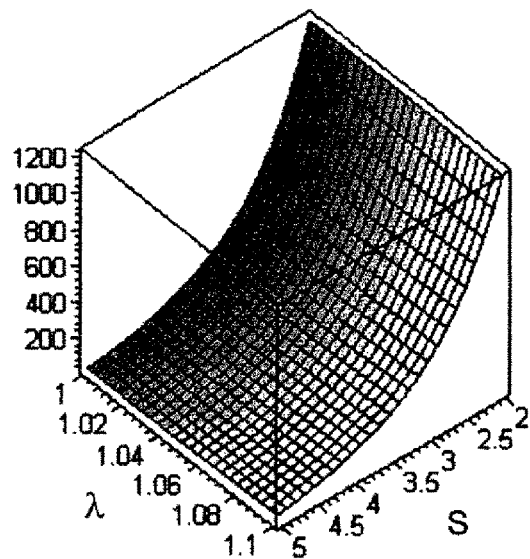
FIG. 10 shows the variation in the coupling coefficient between the two fibers as a function of the normalized distance separating the two waveguides in the spectral range of the (laser) signal.

From the optical and geometrical properties of the step-index fibers it is possible to calculate the amplitude of the coupling coefficient as a function of the normalized distance s=d/a between the two longitudinal guiding axes. In the case of a fiber laser for which $\lambda_c = 0.75$ μm, $\Delta = 10^{-3}$ and a=4.41 μm, the variation in the coupling coefficient between the two fibers shown in FIG. 10 is obtained, shown as a function of the normalized distance between the two waveguides in the spectral range of the (laser) signal.

Figure 11A:
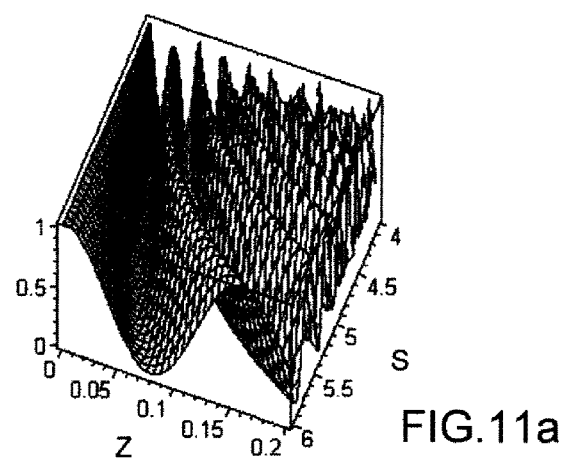
FIGS. 11a, 11b and 11c show the behavior of the fiber coupler as a function of the wavelength, the propagation distance and the normalized spacing between the two optical-fiber cores.
Figure 11B:
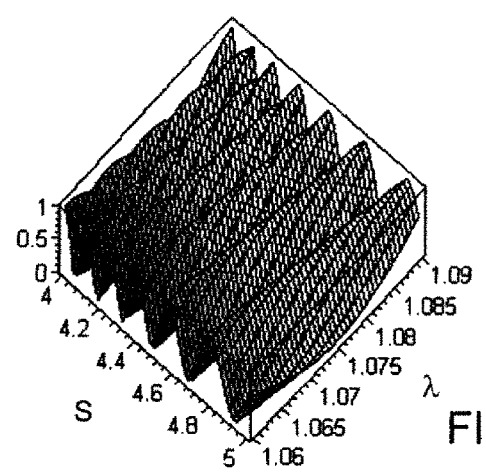
Figure 11C:
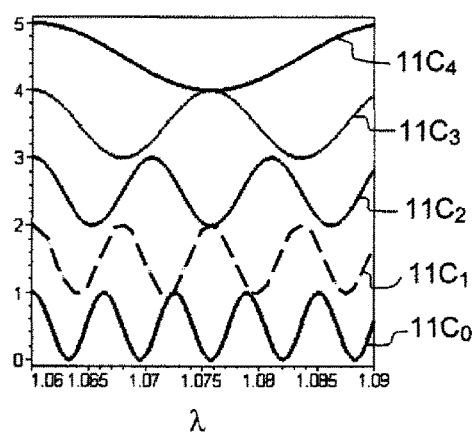

FIGS. 11a, 11b and 11c show the behavior of the fiber coupler as a function of the wavelength, the propagation distance and the normalized distance between the two cores of the optical fibers.

More precisely, FIG. 11a shows the variation in the power transmitted by the excited waveguide of the linear multifiber coupler as a function of s=d/a and of the propagation distance at 1.07 μm, FIG. 11b shows the power at the point z=0.2 m as a function of the wavelength and as a function of the parameter s=d/a and FIG. 11c shows the spectral distribution at the end of the excited waveguide as a function of the distance: z=0.2 m (curve 11c4) at 1 m (curve 11c0) for s=4, with the following intermediate curves 11c3, 11c2, 11c1.

In the case shown, initially an optical wave is coupled to only one of the two waveguides and the coupling is given by:

$$\frac{|a_1(z)|^2}{|a_1(0)|^2} = \cos^2(Cz).$$

In the context of the present invention, it is convenient to consider a linear coupler with a tapered structure. Such an architecture has a coupling coefficient that varies with the propagation distance.

For two coupled fibers with a conicity of 50%, the coupling coefficient depends on z through the z-dependence of the various parameters:

$$C(z) = \frac{\sqrt{2\Delta}}{a(z)} \frac{U(z)^2}{V(z)^3} \frac{K_0(W(z)d(z)/a(z))}{K_1^2(W(z))}.$$

Since $$V(z) = ka(z)n_1\sqrt{2\Delta}$$

it follows that the transverse propagation constants are also functions of z:

$$V(z)^2 = U(z)^2 + W(z)^2 = k^2 a(z)^2 n_1^2 2\Delta.$$

It turns out that the ratio $$d(z)/a(z)$$

is constant whatever z for a linear, and therefore homothetic (constant conicity), stretch.

Figure 12A:
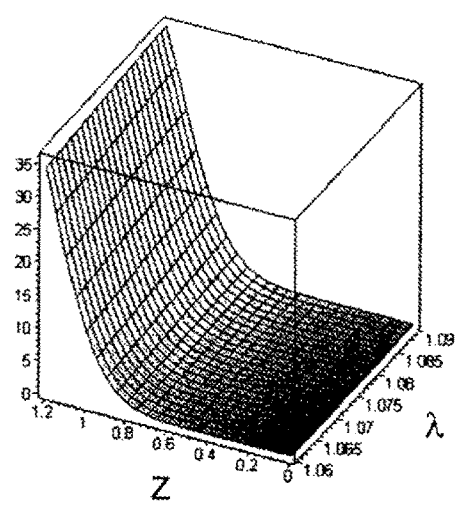
FIG. 12a shows the variation in the local coupling coefficient as a function of the distance z.

FIG. 12a shows the variation in the local coupling coefficient (in m−1) as a function of distance z and the signal wavelength in µm.

To evaluate the effect of coupling one waveguide to another, it is convenient to calculate the effective coupling factor as a function of z, i.e. the integral:

$$C_{eff}z = \int_0^z C(z')dz'.$$

Figure 12B:
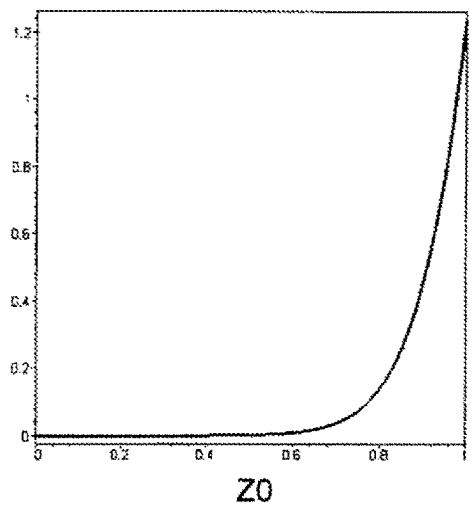
FIG. 12b shows the effective coupling factor $C_{eff}z$ as a function of the distance z into the tapered part.

FIG. 12b shows the effective coupling factor $C_{eff}^z$ as a function of the distance z into the tapered part.

Figure 12C:
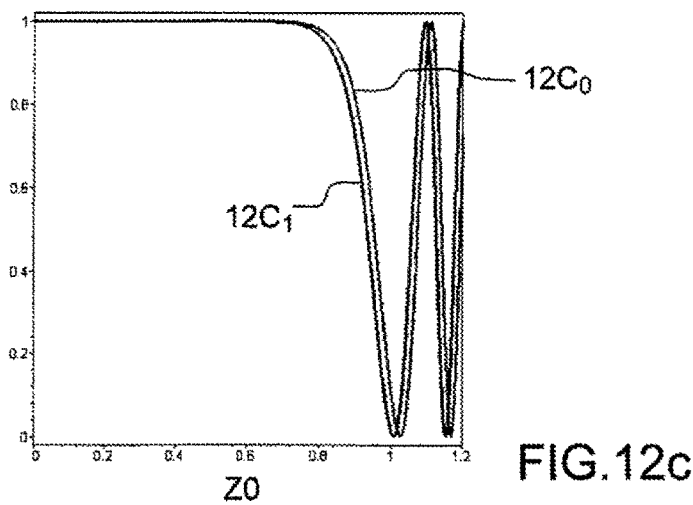
FIG. 12c shows the normalized irradiance distribution of the excited waveguide in a linear coupler configuration with a conical structure at 1.07 μm (curve $12c_0$) and at 1.09 μm (curve $12c_1$) as a function of the propagation distance.

With these longitudinal variations in the coupling coefficient, the irradiance of the excited waveguide varies as shown in FIG. 12c and according to the following formula:

$$\frac{|a_1(z)|^2}{|a_1(0)|^2} = \cos^2\left(\int_0^z C(z')dz\right).$$

FIG. 12c shows the normalized irradiance distribution in the excited waveguide in a linear coupler configuration with a conical structure at 1.07 µm (curve 12c0) and at 1.09 µm (curve 12c1) as a function of the propagation distance.

The concept of multichannel optical fibers may be extended and the coupling equations in the absence of losses may be written as:

$$\frac{da_m}{dz} + i\beta_m a_m = -i\sum_{\substack{n=1 \\ n \neq m}}^{N} C_{mn} \cdot_n$$

Figure 13A:
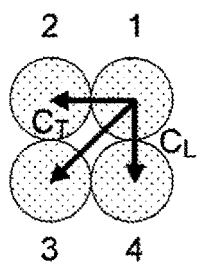
FIG. 13a shows a embodiment of the invention in which the fiber lasers are assembled with a square symmetry.

Exemplary embodiments of a multichannel multifiber laser system according to the invention:

According to one embodiment of the invention, the fiber lasers are bundled with a square symmetry, as shown in FIG. 13a. In this configuration it is convenient to distinguish two inter-fiber coupling coefficients: a direct coupling coefficient $C_L$ and a transverse coupling coefficient $C_T$.

The coupling equations are written as:

$$\frac{da_1}{dz} + i\beta a_1 = -i(a_2 + a_4)C_L - ia_3 C_T$$

$$\frac{da_2}{dz} + i\beta a_2 = -i(a_1 + a_3)C_L - ia_4 C_T$$

$$\frac{da_3}{dz} + i\beta a_3 = -i(a_2 + a_4)C_L - ia_1 C_T$$

$$\frac{da_4}{dz} + i\beta a_4 = -i(a_1 + a_3)C_L - ia_2 C_T$$

The waveguides may be considered to be identical and the coupling coefficient independent of the polarization state. The characteristic equation is obtained by substituting the function:

$$a_j = B_j e^{-i\beta z} e^{-i\Lambda z}$$

where $B_j$ and $\Lambda_j$ are the elements of the eigenvectors and the eigenvalues respectively.

The following matrix equation is obtained:

$$ie^{-i(\beta+\lambda)z}\begin{vmatrix} -\lambda & C_L & C_T & C_L \\ C_L & -\lambda & C_L & C_T \\ C_T & C_L & -\lambda & C_L \\ C_L & C_T & C_L & -\lambda \end{vmatrix}\begin{vmatrix} B_1 \\ B_2 \\ B_3 \\ B_4 \end{vmatrix} = 0$$

the characteristic equation of which is:

$$\begin{vmatrix} -\lambda & C_L & C_T & C_L \\ C_L & -\lambda & C_L & C_T \\ C_T & C_L & -\lambda & C_L \\ C_L & C_T & C_L & -\lambda \end{vmatrix} = 0$$

The four eigenvalues are:

$$\lambda_1 = C_T - 2C_L$$

$$\lambda_2 = C_T + 2C_L$$

$$\lambda_3 = \lambda_4 = -C_T$$

and the associated eigenvectors are:

$$\vec{B}_1 = \begin{vmatrix} -1 \\ 1 \\ -1 \\ 1 \end{vmatrix} \quad \vec{B}_2 = \begin{vmatrix} 1 \\ 1 \\ 1 \\ 1 \end{vmatrix} \quad \vec{B}_3 = \begin{vmatrix} -1 \\ 0 \\ 1 \\ 0 \end{vmatrix} \quad \vec{B}_3 = \begin{vmatrix} 0 \\ -1 \\ 0 \\ 1 \end{vmatrix}$$

Thus, four possible modes are defined.

In the presence of a single incident field the irradiance distributions are given by the formulae:

$$I_1(z) = \frac{1}{4}(1 + 2\cos(2C_L z)\cos(2C_T z) + \cos^2(2C_L z))$$

$$I_2(z) = \frac{1}{4}\sin^2(2C_L z)$$

$$I_3(z) = \frac{1}{4}(1 - 2\cos(2C_L z)\cos(2C_T z) + \cos^2(2C_L z))$$

$$I_4(z) = \frac{1}{4}\sin^2(2C_L z)$$

with $$C_T(s) = C_L(s/\cos(\pi/4)).$$

Figure 13B:
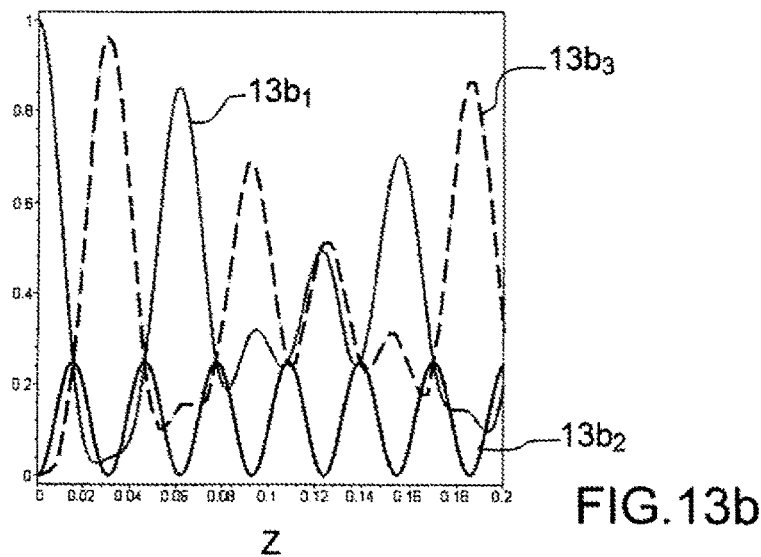
FIGS. 13b and 13c show coupling between waveguides as a function of the propagation distance and the wavelength.
Figure 13C:
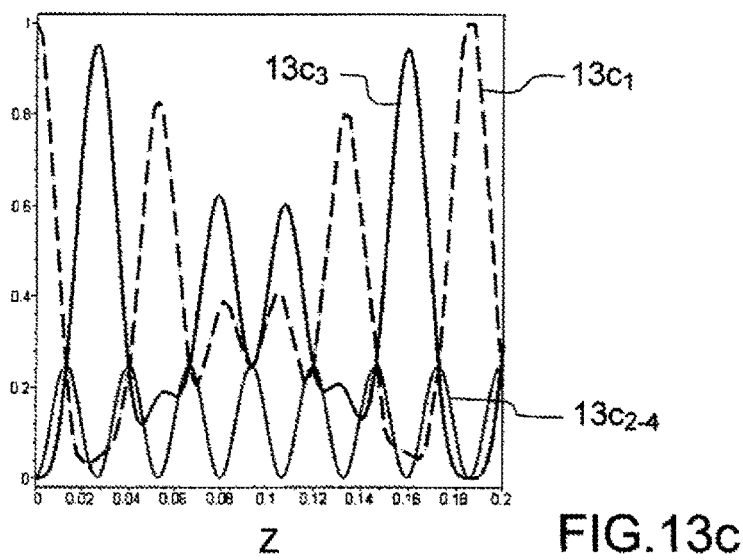

The irradiance distributions were calculated as a function of the propagation distance in this example for a linear multi-fiber coupler with a ratio s=5. FIGS. 13b and 13c show the coupling between waveguides as a function of the propagation distance and the wavelength. More precisely, FIG. 13b shows the variation in the irradiances at 1.06 µm as a function of z for a unit of power injected into the waveguide 1 (curve $13b_1$). The irradiances in 2 and 4 are given by the curve $13b_2$ and the irradiance in the waveguide 3 is shown by the curve $13b_3$. FIG. 13c shows the variation in the irradiances at 1.09 µm as a function of z for a unit of power injected into the waveguide 1 (curve $13c_1$). The irradiances in 2 and 4 are given by the curve $13c_{24}$ and the irradiance in the waveguide 3 is shown by the curve $13c_3$.

The transfer behavior between waveguides 1 and 3 requires two coupling coefficients ($C_T$ and $C_L$)

Figure 13D:
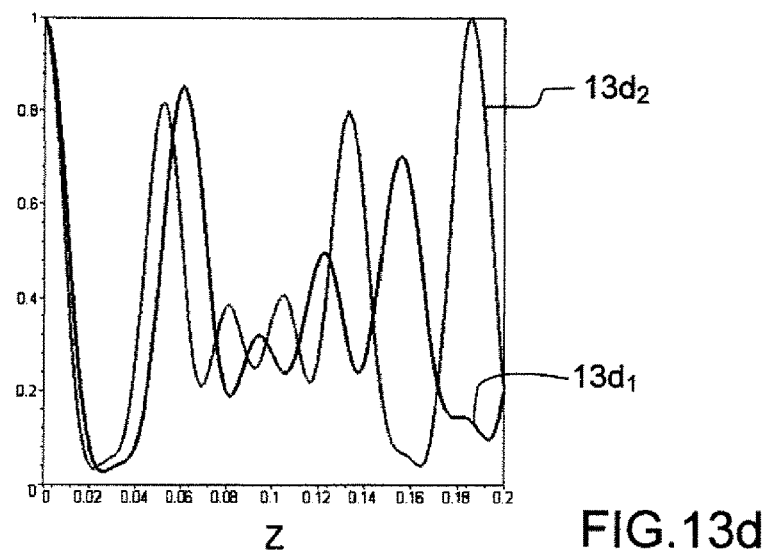
FIG. 13d shows the irradiance distribution in the waveguide 1 as a function of z for various wavelengths.

FIG. 13d shows more clearly the behavior of the irradiance distributions in the excited waveguide as a function of the wavelength, the irradiance distribution in waveguide 1 as a function of z being given both for λ=1.06 μm (curve 13$d_1$) and λ=1.09 μm (curve 13$d_2$).

According to another embodiment of the invention, the laser system may have a symmetrical geometry consisting of a stack of cylindrically configured fibers.

Figure 14A:
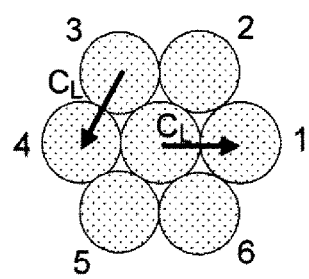
FIG. 14a shows a symmetrical geometry consisting of a stack of cylindrically configured fibers.

This configuration is shown in FIG. 14a. Typically, the initial irradiance may be carried by the central fiber. In this case, the irradiances transmitted by fibers 1 to 6 result from coupling between fibers separated by a common distance s (arranged in an isosceles triangle). The irradiances are given by:

$$I_0(z) = 1 - \frac{6}{7}\sin^2(\sqrt{7}\,C_L z)$$

$$I_n(z) = \frac{1}{7}\sin^2(\sqrt{7}\,C_L z)$$

$$n = 1, \ldots, 6.$$

Figure 14B:
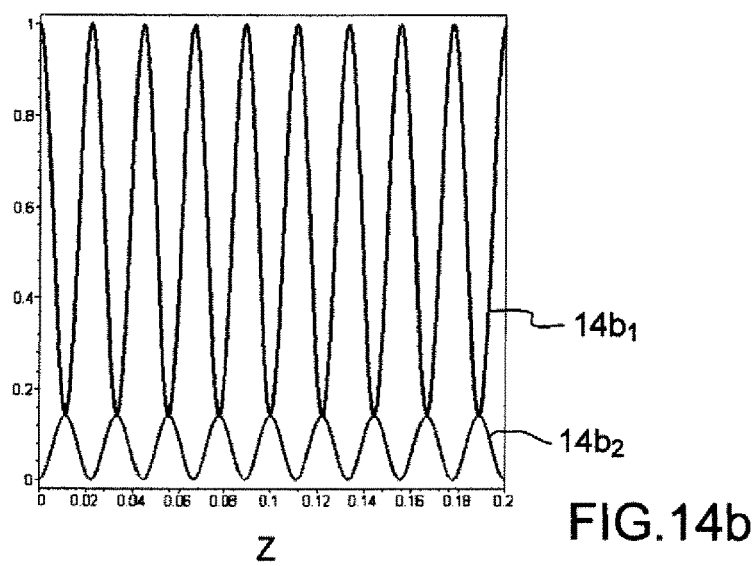
FIG. 14b shows the variation in the irradiance in the central fiber and the irradiance obtained in one of the peripheral coupling fibers as a function of the propagation distance with $s=5$ and at 1.07 μm and FIG. 14c gives a general idea of the spectral distribution at the output of the fibers (i.e. central and peripheral fibers)

FIG. 14b shows the variation in the irradiance in the central fiber and the variation in the irradiance in one of the coupled peripheral fibers as a function of the propagation distance with s=5 and at 1.07 μm and FIG. 14b also shows the irradiance distribution in the central fiber and in one of the six fibers on the periphery with s=5 at 1.07 μm as a function of the propagation distance.

Figure 14C:
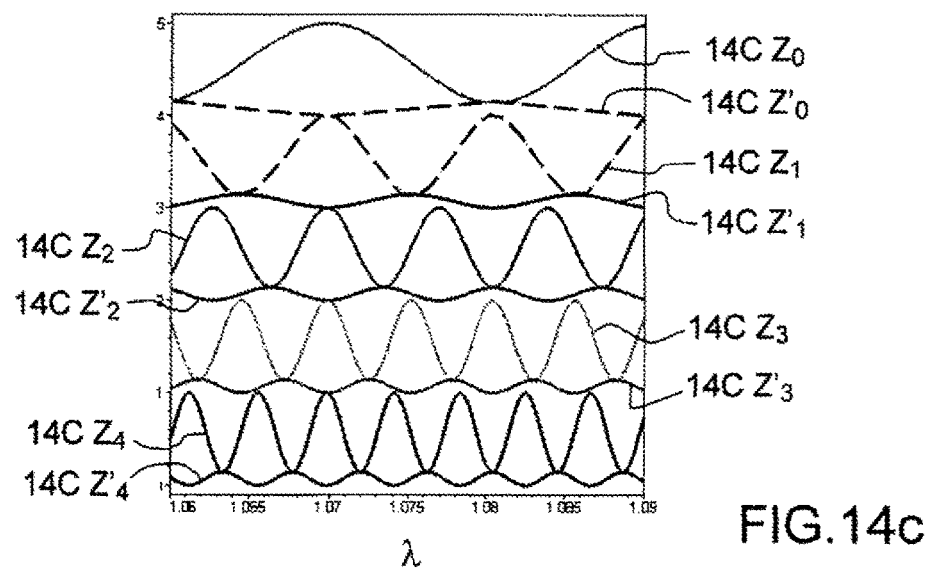

FIG. 14c shows the spectral distribution of the irradiance in the central fiber and in one of the six fibers on the periphery with s=5 as a function of the propagation distance: z0=0.2 m, z1=0.4 m, z2=0.6 m, z3=0.8 m and z4=1 m. The pairs of curves, respectively (14cz0, 14cz0'), (14cz1, 14cz1'), (14cz2, 14cz2'), (14cz3, 14cz3') and (14cz4, 14cz4'), give the spectral distribution at the output of the central fiber, and at the output of an adjacent fiber.

Figure 15A:
FIG. 15a shows a perspective view of an array of fibers, distributed cylindrically, used in a embodiment of the invention.

To produce this type of configuration, one possible geometry consists in taking a bundle of fiber lasers that are stretched at the end. To do this, it is possible to assemble N fibers fi around a central fiber fic, one end of the fibers having been stretched so as to obtain a structure with multiple couplings. FIG. 15a shows a perspective view of such an assembly.

Figure 15B:
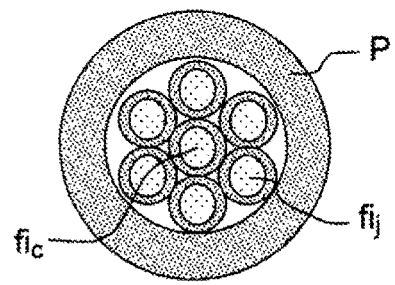
FIG. 15b shows a cross section of another embodiment of the invention, in which a preform comprising an assembly of individual fiber claddings and cores.

It is also possible to produce a preform made of several rods; typically they may be made of silica locally doped with a rare earth as shown in FIG. 15b which shows a cross section of such a preform P and its peripheral fibers $fi_j$ around a central fiber $fi_c$. The central dual-index rod may be doped or undoped so as to provide the output coupler channel for the laser emission. The bundle is then drawn into fibers, the distance between cores being homothetically maintained, and then one of the ends is stretched.

Such a multiple-core fiber is well suited to efficient pumping of the doped regions as it makes use of the modes of the pump waveguiding-structure which have a nonzero azimuthal dependence.

Figure 16A:
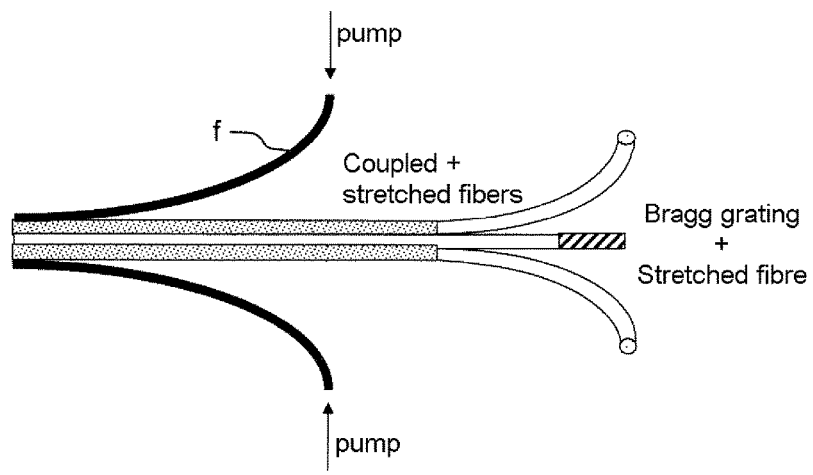
FIG. 16a shows a cross section of an embodiment of a laser system according to the invention.

The geometry of the multifiber laser may take the form shown in FIG. 16a, having:
  a fiber pigtail intended to receive pump power from a laser diode;
  a bundle of radially coupled fibers stretched so as to optimize the coupling; and
  a central fiber from which the laser beam emerges.

At the end of this fiber may be placed a Bragg reflector providing a feed-back mirror function or an external mirror. A self-organization occurs depending on the forward and return paths in the bundle of laser cavities According to another embodiment, the laser system comprises:
  a parabolic or triangular graded-index core structure;
  a bundle of multicore couplers (monolithic in the form of a multifiber or specific preform), the bundle being stretched at one end; and
  an optical axicon at the other end.

Figure 16B:
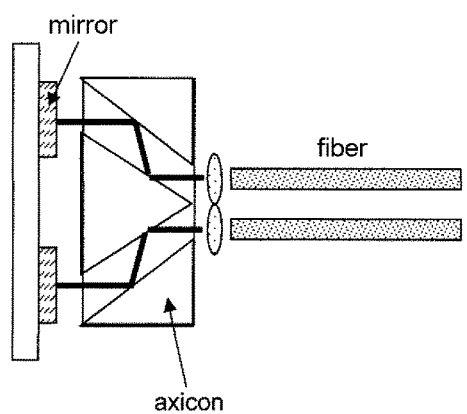
FIG. 16b shows another embodiment of the invention comprising an axicon.

Such an architecture enables the polarization state to be controlled, this being the equivalent of providing specific couplers and multiplexing the polarization states, as shown in FIG. 16b.

Generally, to produce fibers having, at least over one section, a tapered region, it is possible to use a chemical etch (for example employing hydrofluoric acid HF).

It is also possible to envisage welding a fiber with a dedicated undoped end to obtain the desired profiles (provided that the two guiding structures are optimized so as to achieve mode matching).

According to one embodiment of the invention, the graded-index core fibers may be produced using the method described below.

Figure 17:
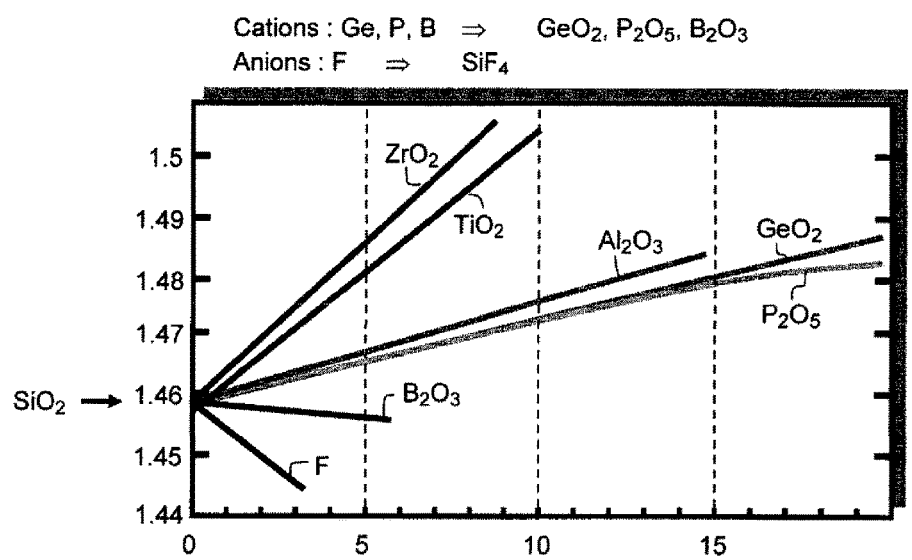
FIG. 17 shows the variation in the refractive index of $GeO_2$-doped silica.

It is known that the index of a fiber core made of silica (SiO2) can be increased by incorporating into it molar percentages of, for example, germanium oxide. FIG. 17 thus shows the change in the refractive index of the silica composite caused by a gas stream carrying Ge, P or B cations.

Figure 18:
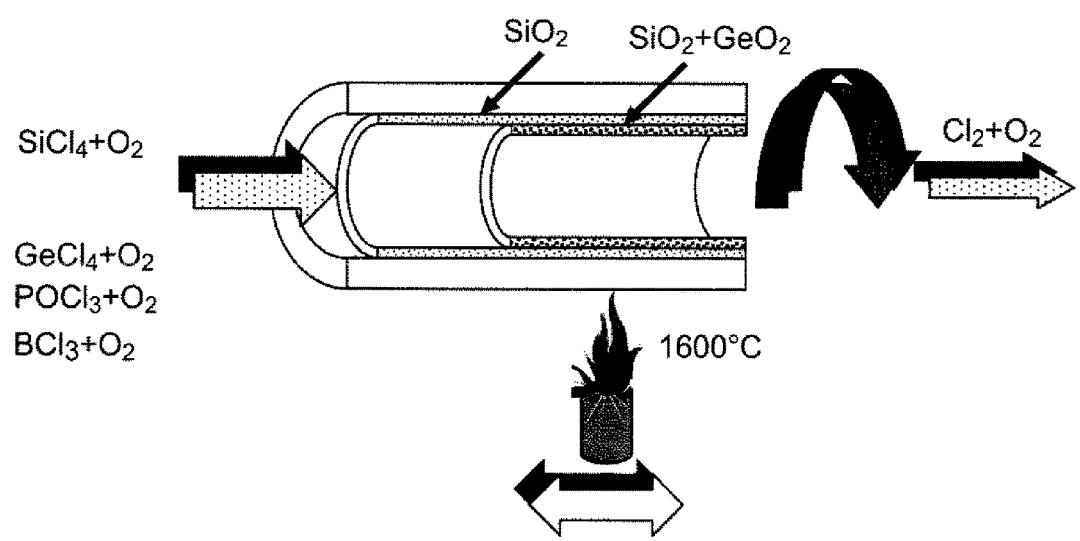
FIG. 18 shows a fiber production step implemented in the invention.

Thus, by implementing chemical vapor deposition, it is possible to deposit, within a rod, internal layers, the index of which varies depending on the concentration of the stream carrying a varying percentage of Ge cations, enabling thereby the desired radially graded-index of the present invention to be obtained, as shown in FIG. 18.

The invention claimed is:

1. A power fiber laser system comprising:
  at least one single-mode fiber laser, emitting at a signal wavelength, said fiber laser comprising at least one outer cladding and at least two cores,
  one of the at least two cores being configured as a central core and further configured such that a laser emission beam emerges,
  the central core being arranged in a tapered section of the fiber,
  a single reflector directly coupled to only one end of the central core and configured to provide feedback at said only one end of the central core, and remaining ones of the at least two cores are configured without a reflector,
  wherein each of the at least two cores of said fiber laser has a radially graded index and comprises, at least over a part of its length, a geometrical section, having a graded fiber-core radius that decreases between an input end of the geometrical section and an output end of the geometrical section, the graded fiber-core radius and an index variation between the cladding and the core at the input end being configured such that a normalized frequency of the signal wavelength is less than a normalized cutoff frequency at which the fiber laser becomes unimodal.

2. The power fiber laser system as claimed in claim 1, wherein the graded index has a parabolic profile.

3. The power fiber laser system as claimed in claim 1, wherein the graded index has a triangular profile.

4. The power fiber laser system as claimed in claim 1, wherein the fiber laser comprises a section of conical geometry, a first, cladding radius ($r_1$) and a second, core radius ($r_2$), the first and second radii being defined as a function of length z, respectively, by the following equations:

$$r_1(z)=r_{1c}(1-m_1z)$$

$$r_2(z)=r_{2c}(1-m_2z),$$

wherein $r_{1c}$ and $r_{2c}$ are the initial radius; and wherein $m_1$ and $m_2$ are the conicity.

5. The power fiber laser system as claimed in claim 1, wherein the at least two cores are distributed and configured so as to couple modes in said at least two cores.

6. The power fiber laser system as claimed in claim 5, wherein the at least two cores are distributed and configured in a geometrical array in a plane perpendicular to the length of said at least one single-mode fiber laser.

7. The power fiber laser system as claimed in claim 5, wherein the at least two cores are distributed in a circle.

8. The power fiber laser system as claimed in claim 1, further comprising a preform comprising an assembly of individual fiber claddings and cores.

9. The power fiber laser system as claimed in claim 1, further comprising:
 a fiber pigtail configured to receive pump power from a laser diode; and
 a bundle of radially coupled fibers comprising a stretched construction so as to optimize a coupling therebetween,
 wherein the single mode fiber laser is configured such that the signal wavelength of the laser emission beam emerges from the central core.

10. The power fiber laser system as claimed in claim 5, wherein the single reflector is configured to implement a mirror function.

11. The power fiber laser system as claimed in claim 10, wherein the single reflector includes a Bragg reflector.

12. The power fiber laser system as claimed in claim 1, further comprising axicons coupled to opposite ends of the at least one single-mode fiber laser comprising conical sections.

13. The power fiber laser system as claimed in claim 1, further comprising at least one fiber having a silica cladding.

14. The power fiber laser system as claimed in claim 1, further comprising at least one fiber comprising a $GeO_2$-doped silica fiber core.

15. The power fiber laser system as claimed in claim 14, wherein a fiber core of the at least one fiber comprises peripheral layers containing varying amounts of $GeO_2$ so as to ensure a radially graded index within the fiber core.

16. The power fiber laser system as claimed in claim 1, further comprising at least one fiber having a fiber core made of silica doped with rare-earth ions.

17. The power fiber laser system as claimed in claim 6, wherein the single reflector is configured to implement a mirror function.

18. The power fiber laser system as claimed in claim 17, wherein the single reflector is configured to implement a Bragg reflector.

19. A power fiber laser system comprising:
 a single-mode fiber laser configured to emit a signal wavelength comprising:
 a fiber including at least one outer cladding and at least two cores, one of the at least two cores being configured and arranged as a central core from which a laser emission beam emerges,
 the central core being arranged in a tapered section of the fiber,
 a single reflector directly coupled to only one end of the central core and configured to provide feedback at said only one end of the central core and remaining ones of the at least two cores are configured to operate without a reflector,
 each said core of the fiber comprising a radially graded index that comprises, at least over a part of its length, a geometrical section having a graded fiber-core radius that decreases homothetically between an input end and an output end, and
 for each said core, a core radius and the index variation between the cladding and the fiber at the input end being configured such that a normalized frequency of the signal wavelength is less than the normalized cutoff frequency at which the fiber becomes unimodal.

20. The power fiber laser system of claim 19, wherein the single reflector is a mirror or a Bragg reflector.

* * * * *